April 12, 1949.  C. I. PLACE  2,467,226
VARIABLE SPEED AND TORQUE DRIVE
Filed Aug. 9, 1945  2 Sheets-Sheet 1
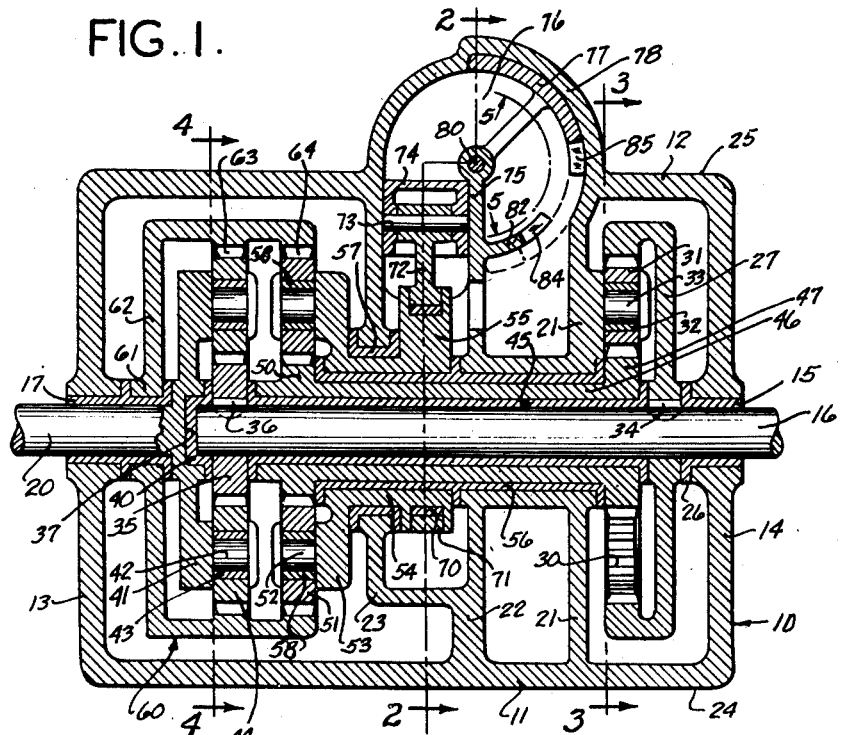
FIG. 1.
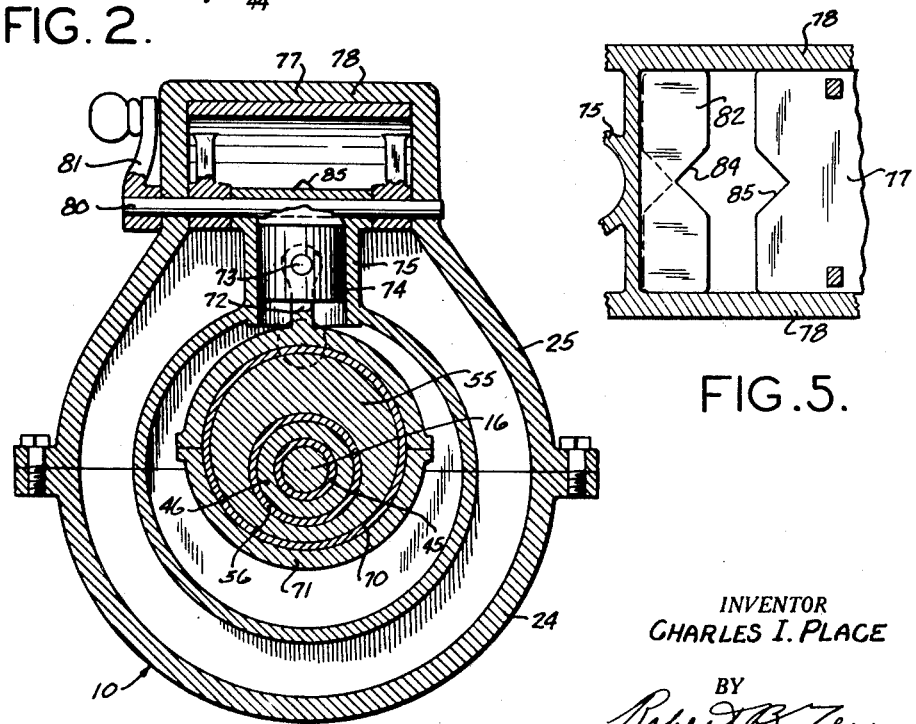
FIG. 2.
FIG. 5.
INVENTOR
CHARLES I. PLACE
BY
ATTORNEY April 12, 1949.  C. I. PLACE  2,467,226
VARIABLE SPEED AND TORQUE DRIVE
Filed Aug. 9, 1945  2 Sheets-Sheet 2

INVENTOR
CHARLES I. PLACE
BY
Robert B. Terry
ATTORNEY

Patented Apr. 12, 1949

2,467,226

UNITED STATES PATENT OFFICE 2,467,226

VARIABLE-SPEED AND TORQUE DRIVE

Charles I. Place, Norfolk, Conn.

Application August 9, 1945, Serial No. 609,786

8 Claims. (Cl. 74—681)

This invention relates to variable speed and torque drives, and more particularly to an improved power transmission mechanism for operative interposition with a prime mover and connected load device, as in stationary power plants, automotive and marine installations, particularly, but without limitation, any such assembly in which an internal combustion engine serves as a power source.

Prevalent power transmission mechanisms are of those types which, for the most part, attain variable speed and torque values in a power takeoff element, by employing stepped gear trains, and embody various devices for shifting between selected definite combinations of gear elements to vary the torque and speed transmitted from the prime mover. Such changes are usually effected by means of shifting forks, brakes, clutches and similar control accessories, such that, intervening the operative selection of differing speed ratios, a so-called neutral period is necessary. These heretofore prevalent modes of speed change, in conventional power transmissions, result in a loss of time incident to the act of shifting from one speed ratio to another.

Although there are now well known numerous generally similar types of fluid drives, fluid flywheels, and hydraulic power transmissions, those which have thus far appeared in trade are characterized by a considerable weight and bulk, in some cases an extremely complicated control mechanism, and in all cases as far as known, a relatively low power transmitting efficiency. It is accordingly a general objective of the present improvements to overcome the several prevalent objections currently obtaining in commercial speed and torque transmission devices.

A further and important objective advantage of the present improvements is a reduction of time required in effecting changes in transmitted speed and torque values.

A still further and important object of the present invention is attained in a reduced degree of wear on the prime mover, such as an internal combustion engine, to which the improved assembly is operatively connected. This results from the provision of an infinite variation of speed and torque applied to the connected load. The improved arrangement permits of a more or less definite control of speed and torque values, so as to avoid even any current overloading of the prime mover, a condition which can only be approximated in the stepped-ratio types of power transmission mechanism.

The foregoing and numerous other objects will more clearly appear from the following detailed description of a selected embodiment of the invention, particularly when considered in connection with the accompanying drawing, in which:

Fig. 1 is a longitudinal sectional elevation through an enclosed hydromechanical assembly embodying the present improvements;

Fig. 2 is a sectional view taken in a vertical plane, or more specifically along staggered planes as indicated by line 2—2 of Fig. 1;

Fig. 5 is a fragmentary elevational view somewhat enlarged, being a planar development showing a feature of improvement of a hydraulic control valve assembly, the location of this structure in the complete organization, being indicated by line 5—5 of Fig. 1.

Figure 3:
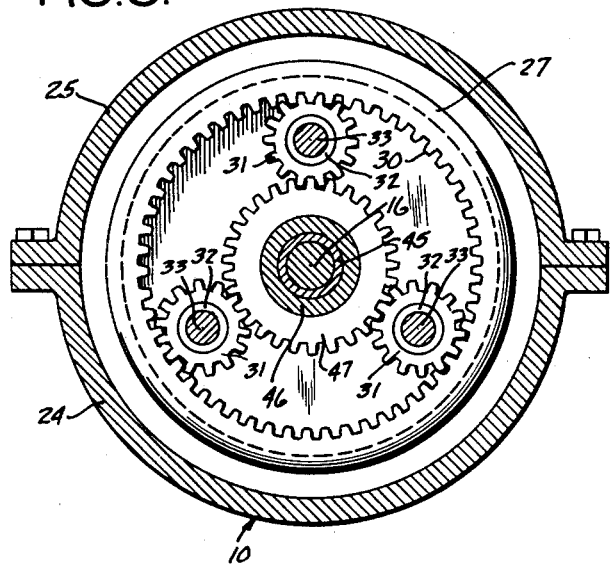
Fig. 3 is a vertical sectional elevation along a plane indicated by line 3—3 of Fig. 1.

Referring now by characters or reference to the drawing, it is of course preferred that the assembly be enclosed in a suitable housing or casing element generally indicated at 10, and including side walls 11 and 12, with end walls 13 and 14, there being journalled in the end wall 14 as through a suitable bushing or bearing element 15, a power input or drive shaft 16. Similarly in the opposite end wall 13, as through a bushing element 17 there is journalled a power takeoff or driven shaft 20, connected in any suitable manner to the driven element or load.

It is contemplated that the case or housing 10 contain, and preferably be substantially filled with a suitable lubricant such as an oil bath through which the various rotating elements to be described, are self-oiling during operation. Further, it is a preference to provide the case 10 with any desired plurality of integral (or separable) cross webs or internal plates, one of which is shown at 21 nearest the power input end of the assembly, and a second at 22, with which is or may be incorporated a third such web 23. For convenience in casting or otherwise in manufacture, the case may be divided into a lower section 24 and an upper section 25 suitably assembled as by screw elements.

Proceeding now to describe the internal and rotating elements of the assembly, it is seen from Fig. 1 that the bushing 15 is flanged as at 26 to provide a spacer, and axially adjacent this flange is an annular or ring gear 27 provided with internally presented teeth 30 which are in constant mesh relation with a plurality (shown as three in Fig. 3) of drive pinions 31. Each of these pinions is rotatively mounted, as through an intervening bushing 32, on a fixed pin 33, this pin being headed for retention of the pinion and fixedly mounted, for example by suitably expanding it in a bore in the web element 21. It will be noted that the ring gear 27 is fixedly carried by shaft 16 as through a key 34.

Figure 4:
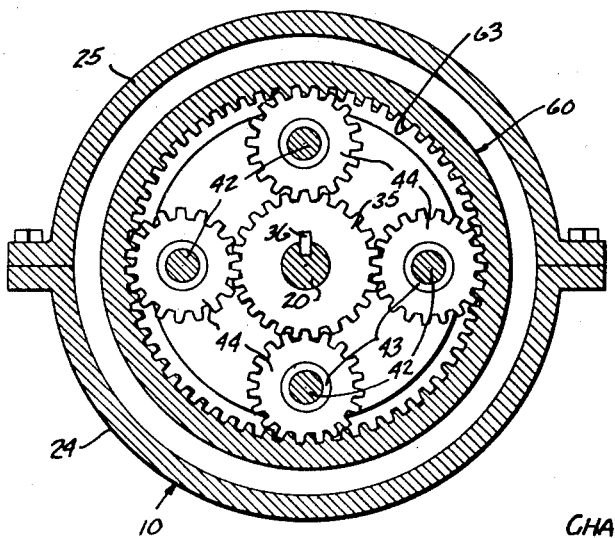
Fig. 4 is a vertical sectional elevation as viewed along line 4—4 of Fig. 1.

Mounted near the opposite end of the relatively elongated drive shaft 16, is a second drive gear 35 (Figs. 1 and 4), being fixedly attached to shaft 16 as exemplified by the key element 36.

A preferred arrangement conducing to compactness of assembly, is to locate the drive shaft 16 and driven shaft 20 in coaxial relation as shown, and to provide in the rearmost end of shaft 20 a circular socket 37 which receives a cup-like bushing 40, which in turn receives and serves as a journalling element for the end of shaft 16.

Extended radially of the socketed portion of shaft 20 is a spider element 41 fixedly carrying a plurality, (shown as four) of pinion shafts or pins 42, about each of which is a suitable bearing or bushing element 43 serving in turn to receive the rotatable pinions of this group indicated at 44. It will now have appeared that a turning moment applied to the spider 41 serves to rotate the power takeoff or driven shaft 20, and further it will now be seen that there has been established a constant mesh gear drive train or connection between drive shaft 16 and the takeoff shaft 20, the function of which, in cooperation with other elements, will be more particularly described later herein.

Carried by the intermediate portion of the drive shaft 16 is an elongate tubular element 45, in the nature of a journal element or bushing, and coaxially mounted and journalled thereon is a drive sleeve 46, near the power input end of which is a gear 47 (Figs. 1 and 3). It will now be observed that the gear 47 is in constant mesh with each of the plurality of pinions 31. The latter being mounted on fixed axes and driven by the ring gear 27 will, through gear 47, impart a rotative movement to sleeve 46. Near the opposite end of sleeve 46 is a gear 50 fixed to or formed integrally with the sleeve, the gear 50 being in constant mesh, in the relation of a sun gear, with a plurality of planet pinions 51. Each of pinions 51 is provided with a suitable bushing 58 and is mounted on a headed axis pin 52 fixedly supported in a spider 53 formed integrally with or secured to a second sleeve element 54; the opposite end of this sleeve element carries or is formed to provide an eccentric 55 for a purpose later better appearing. This spider 53, sleeve 54 and eccentric 55 assembly constitutes a floating member in the sense that, except as controlledly retarded or subjected to braking action, it will normally tend to rotate freely, and to this end is journalled internally on a suitable elongate bushing element 56 surrounding the sleeve 46, and is externally bushed or journalled as by an element 57 supported in an opening therefor in the fixed web or plate member 23.

Proceeding now to describe the manner of effecting an operative connection between the gear 50, more particularly the pinions 51, and the power takeoff shaft 20, there will be seen from Fig. 1, nearer the driven end of the unit, a structure exemplified by a substantially cylindrical double-ring gear member generally indicated at 60. This may also be described as a floating member, in the sense that it is freely revolvable and includes, to this end, a sleeve or hub portion 61, a web 62, the hub being journalled as through an extension of bushing 17 revolving about the same axis as the drive and driven shafts. The web 62 is extended in an axial direction to constitute a large annulus provided with a double row of internal gear teeth 63 and 64. The row of teeth 63 are in constant mesh relation with the pinions 44, and the row of teeth 64 is similarly related to the group of pinions 51 carried by spider 53 on the second rotatable sleeve 54. From the structure described, it will now have become apparent that the motion imparted to the large double gear unit 60 is that derived from the resultant of both sets of pinions 44 and 51, but that, being a floating element, the gear unit 60 is not directly connected to the driven shaft 20 but serves as an intermediate motion-imparting agency as will later better appear.

It has been noted heretofore that the second rotatable sleeve 54 together with spider 53 and eccentric 55 may at times rotate freely, as under a no-load condition through the unit. It will now have appeared as possible to attain a variable torque and speed drive through the unit, by selective retardation of the planetary motion of spider 53, hence of pinions 51. This is accomplished, in the example shown, by a hydraulic control feature now to be described.

Rotatably mounted about the eccentric 55 on which may be mounted a suitable bushing 70, is an eccentric strap 71 which carries a connecting rod 72, pivoted through a piston pin 73 to a piston 74 with which cooperates a cylinder 75 (Fig. 2). The relation of the webs or plates 22 and 23 and the structure forming the cylinder 75 is such as to provide for liquid displacement on and by opposite sides of the piston 74 as the piston is reciprocated under the influence of the eccentric. This serves, during floating actuation or partially retarded control of the sleeve and eccentric, to effect an oscillating displacement of a liquid completely or partly filling the space on opposite sides of the piston, and occupying a channel or passage connecting these spaces, and generally indicated at 76. Flow in either direction through this passage 76 is controlled by a valve assembly (Figs. 1 and 5) which includes a movable valve element 77 operating in and along an extension 78 of the housing 10, and which is fixedly secured to a valve control shaft 80 provided with an external, handled valve-control lever 81. Cooperating with the movable element 77 is a valve seat member 82 which may be conveniently formed as an extension of the wall 22 or attached thereto as desired in such relation that the fixed valve member is of arcuate section and of segmental shape similar to member 77, these two elements cooperating slidably so that, as the movable valve member is shifted in a shut-off direction, it variably overlaps the member 82, when near closed position of the parts.

As conducing to a nicety of regulation of resistance imparted to piston 74 and hence to the rotation of eccentric 55, provision is made for a very gradual restriction of the sectional area of effective valve passage, in a manner exemplified by Fig. 5, from which it will be seen that each of the elements 77 and 82 is provided with a generally V-shaped notch, extending from its leading edge rearwardly thereof, the notches being indicated respectively at 84 in element 82, and 85 in element 77. It will be apparent from Fig. 5 that when as through actuation of shaft 80, these elements are increasingly superposed as in moving toward valve closing position, there results a very gradually decreasing area of opening which in some positions of the parts, will assume an approximate diamond shape, enabling a gradually retarded cutoff of oil flow, and accordingly effecting a nicely graduated control of piston, hence of eccentric retardation.

The operation of the variable speed and torque mechanism heretofore described by a review of the several elements of a selected example thereof, is thought to have become apparent from the description of parts, but may be amplified by some further reference to their function. Let it be assumed that the case 10 is filled or substantially filled with a fluid, such as oil, an engine for example, operatively connected to the power input shaft 16, and a load being imposed on power takeoff shaft 20, and that the control valve 77 is fully open. Under these conditions, rotation of the drive shaft 16 will cause the annular gear 27 to revolve the one or more pinions 31. These are mounted on fixed axes and their revolution will in turn serve to revolve the sleeve 46 through gear 47, and therewith, the gear 50. Now obviously the sleeve 46 and its attached gears will be caused to rotate in a direction opposite that of the annular gear 27. Now, as earlier noted, the revolution of the power input shaft 16 will also necessarily rotate with it the sun gear 35, the rotation of which will in turn, rotate the one or more planet gears 44 with which the sun gear 50 is in mesh. Now also enmeshed with the several planet gears 44 is the large double annular gear 60, particularly the gear teeth 63 thereon, and further enmeshed with the planet gears 51, as heretofore noted, is the same annular gear 60, particularly the row of teeth 64 thereon. In view of the fact that the two gears or rows of gear teeth 63 and 64 are integral with the same floating annulus, they are in effect secured to each other and hence always revolve together.

It has thus far been assumed that valve 77 is still fully open, with a load imposed on the output shaft 20. Under this condition the spider 41 will tend to remain stationary and the sun gear 35 will rotate the enmeshed planets 44 and cause the double annular gear 60, hence gear elements 63 and 64 thereon, all to revolve in a direction opposite that of the sun gear 35. It will now be observed that two gears are concurrently acting on the group of planet pinions 51, these being the annular gear teeth 64 and the sun gear 50 on sleeve 46. Both the large double annular gear and the sun gear 50 are now revolving in the same direction but at different speeds, and will serve to carry with them, in planetary motion, the pinions 51 and the spider 53 at a rotative speed which is the mean or average of the gears 60 and 50.

It has heretofore been pointed out that since the spider 53 is fixedly carried by the second sleeve 54 as is also the eccentric 55, whatever movement is imparted to sleeve 54 is similarly imparted to the eccentric in a manner to reciprocate the piston 74. Since the valve 77—82 still remains open, free movement of the piston is not impeded, nor is free movement of sleeve 54 with spider 53, etc., and the said piston movement will cause fluid to pass freely between opposite sides of the piston. The mechanism may now be described as in neutral condition, in the sense that no motion is transmitted by the gearing, to the output shaft, due to the load imposed on the latter.

Assume now that the flow control valve is partly closed: As the movable valve element approaches its closing point, a load is placed on the piston 74 by the braking effect, retardation or resistance due to the current necessity of forcing the fluid through the relatively reduced or constricted passage 84—85. This retardation of the piston being in accordance with the extent of closure of the valve which is subject to control, it is now apparent that piston movement is retarded in proportion to such loading.

It will now clearly appear that the braking effect provided by hydraulic resistance to movement of the piston 74, will, pro tanto, retard the movement of the eccentric 55. This, in turn, will similarly retard the second sleeve 54 and the spider 53, thus causing the sun gear 50 to rotate planet pinions 51, thus in turn controlling the movement of the large double annular gear 60 carrying gear teeth 63 and 64. It is of course possible that under certain conditions of load on the piston, there may be caused a reverse rotation of the annular gear 60 together with the integral sleeve or hub 61. Retardation of rotation of the large double annular gear will, now obviously, cause the planet pinions 44 to tend to follow the meshing sun gear 35 in its rotation, and will tend to carry along the spider 41, thus imparting rotation to the power takeoff shaft 20. It thus becomes apparent that variable speeds with varying torque values, can be imparted to the takeoff shaft through control of the valve 77—82.

It is of course obvious that, since it is possible completely to block the flow of liquid between opposite sides of the piston 74 by full closure of the control valve, piston movement, hence movement of eccentric 55, can be completely checked. Now since sleeve 46 and the gears attached thereto are driven by the annular gear 27 at a speed greater than that of the power input shaft 16, and hence at a speed greater than that of the sun gear 35, it will be seen as possible to drive the power takeoff shaft 20 at a greater speed than the power input shaft 16. The described organization of gear-connected elements may thus be varied as desired, to attain predetermined torque and speed values through the unit.

It is important to note that, in distinction over many of the similar arrangements heretofore experimentally attempted by others, the mechanism currently described serves to impart rotative energy from the power input shaft 16, through two distinct lines or paths of power flow, to the driven shaft 20, and that these two courses of power flow prior to their convergence, follow distinct operative power paths. One of these may be traced from the power input shaft 16 directly to the gear 35, thence to pinions 44 via spider 41, thence directly to shaft 20. The other line of torque transmission may be traced from power input shaft 16 to the ring gear 27, thence to pinion or pinions 31, gear 47, sleeve 46, gear 50, thence via pinions 51 to the large double gear unit 60, thence through pinions 44, spider 41 and power takeoff shaft 20. It will now be observed that these two lines of power flow may be considered, at least under certain conditions, as torque components and that these converge and attain a resultant in the turning moment imparted to the spider 41. The course of flow last described is subjected to control through the pinions 51 and spider 53 by the described hydraulic control. Thus under conditions wherein the piston is stopped, the gear 50, through pinions 51, drives the gear 60 at a speed greater than it is driven by gear 35 through pinions 44, so that both lines of power now converge in pinions 44 to rotate, with over drive effect, the spider 41 with the takeoff shaft. It is important to note, however, that in usual ranges of operation both of the gears 35 and 63 coact to produce variable torque and speed values on the power takeoff shaft.

In the interest of brevity, but a single example has been selected for disclosure, this showing an arrangement of epicyclic gearing. Because of the detail of the present description it should be understood in an illustrative, rather than in any restrictive sense, because of the many variants possible in the elements and their arrangement, without departing from the full intended spirit and scope of the appended claims.

I claim as my invention:

1. In a variable ratio transmission, a drive shaft having first and second gears fixedly carried thereby, a driven shaft, a pinion carried by said driven shaft and meshing with the second drive shaft gear, a rotatable sleeve, a gear on the sleeve operatively connected with the first drive shaft gear, and said sleeve having a gear drive connection to the driven shaft pinion, the last said gear drive connection including an orbitally movable pinion which is freely rotatable, except as controlledly retarded, and a double ring gear interconnecting said pinions, and means for applying a variable retarding force for checking orbital movement of said orbitally movable pinion.

2. In a variable speed and torque transmission, a drive shaft, a driven shaft, a spider secured to the driven shaft, a first plurality of planetary pinions carried by the spider, means forming a direct gear connection from the drive shaft to said pinions, a floating sleeve geared to the drive shaft, a second plurality of planetary pinions geared to said sleeve, a double annular gear meshing with said first and second plurality of pinions, and means for controlling the planetary movement of said second plurality of pinions.

3. In a variable ratio transmission, a drive shaft, a driven shaft, a spider fixedly carried by the driven shaft, a pinion on said spider, a gear on the drive shaft meshing with said pinion, a ring gear fixedly carried by the drive shaft, a pinion meshing with the ring gear and mounted for rotation on a fixed axis, a rotating sleeve, a gear on the sleeve driven by the last said pinion and elements establishing a constant mesh gear connection of the sleeve to the pinion on said spider, and means for varying the drive ratio through the said constant mesh gear connection.

4. The combination and arrangement of elements as recited by claim 3 but further characterized in that said gear on the sleeve is disposed near one end of the sleeve, in that said elements include a gear fixedly secured to the opposite end of the sleeve, and in which the drive and driven shafts are coaxial and interfitting, and the sleeve arranged coaxially with said shafts.

5. In a variable ratio transmission, a drive shaft, a driven shaft, a spider carried by the driven shaft, pinions rotatably supported on said spider, a second set of pinions mounted for orbital movement and located adjacent those aforesaid, a double internal annular floating gear enmeshed with both said sets of pinions, a gear on the drive shaft enmeshed with the first said set of pinions and a variable-ratio gear drive connection from the drive shaft to the first set of pinions and including said second set of pinions, and means for variably retarding the orbital movement of the pinions of the second set.

6. In a variable speed and torque transmission, a drive shaft, a driven shaft, an annular spider secured to the driven shaft, one or more pinions rotatably mounted on the spider, a gear on the drive shaft meshing therewith, a floating double annular gear meshing with the spider pinions, an additional connection of variable ratio type between the drive shaft and said pinions including a ring gear on the driving shaft, a fixedly mounted pinion enmeshed with said ring gear, a sleeve geared to the last said pinions, a further set of pinions geared to the sleeve, a rotatable structure by which said further set of pinions are supported for planetary movement, said further set of pinions being in mesh with said double annular gear, and means for selectively retarding the planetary movement of said further set of pinions.

7. In a variable speed and torque transmission, a drive shaft, a driven shaft, an annular spider secured to the driven shaft, one or more pinions rotatably mounted on the spider, a gear on the driving shaft meshing with said pinions, a floating double annular gear also meshing with the spider pinions, a variable ratio connection between the driving shaft and said pinions including said double gear and a ring gear on the driving shaft, together with a second set of one or more pinions rotatable on fixed axes and enmeshed with said ring gear, a sleeve geared to said second set of pinions, a third set of pinions, said sleeve being geared to said third set of pinions, a rotatable structure by which said third set of pinions is supported for planetary movement, said third set of pinions being in mesh with said double internal annular gear, and means for selectively retarding the said rotatable structure, the drive shaft extending within the assembly and being journalled in an end portion of the driven shaft, said sleeve being journalled about the drive shaft, and a second floating sleeve journalled coaxially with the first said sleeve, serving to carry the third set of pinions and forming a part of said rotatable structure.

8. In a variable speed and power transmission, a case arranged normally to be filled with a lubricant, a drive shaft extending into said case, a driven shaft coaxial with the drive shaft and having a socketed end portion adapted to receive the internal end of the drive shaft, an annular spider secured to the driven shaft, a plurality of pinions rotatably carried by the spider, a double internal annular gear element floatingly mounted coaxially with the drive and driven shafts and enmeshing with the pinions on the driven shaft spider, a gear secured to the drive shaft and also enmeshing with the pinions on the driven shaft spider, a ring gear carried by the drive shaft, a set of one or more pinions provided with fixed axes about which said pinions rotate, and enmeshing with the ring gear, an elongate sleeve journalled about the drive shaft and having a gear meshing with the last said pinions, and a second gear remote therefrom also fixed to the sleeve, a second sleeve rotatable floatingly about the axis of the first said sleeve, a spider carried by the second sleeve, a plurality of pinions rotatably mounted on the last said spider and enmeshing with the last said gear on the first said sleeve and with a portion of said double internal floating gear, an eccentric on the second said sleeve, an eccentric strap, a piston arranged to be reciprocated by the eccentric strap as the second sleeve is rotated, a cylinder cooperating with the piston, a passage connecting opposite sides of the piston, a valve in said passage and control means for the valve, the valve being arranged variably to obstruct the passage between opposite sides of the piston.

CHARLES I. PLACE.

REFERENCES CITED

The following references are of record in the file of this patent:

UNITED STATES PATENTS

| Number | Name | Date |
|---|---|---|
| 672,013 | Rydberg | Apr. 16, 1901 |
| 1,288,525 | Crell | Dec. 24, 1918 |
| 2,102,131 | Schmid | Dec. 14, 1937 |

FOREIGN PATENTS

| Number | Country | Date |
|---|---|---|
| 285,656 | Italy | May 19, 1931 |